US008953595B2

(12) United States Patent
Janneteau et al.

(10) Patent No.: US 8,953,595 B2
(45) Date of Patent: Feb. 10, 2015

(54) ROUTE-OPTIMISED MULITCAST TRAFFIC FOR A MOBILE NETWORK NODE

(75) Inventors: Christophe Janneteau, Bois D'Arcy (FR); Alexis Olivereau, Orsay (FR); Alexandru Petrescu, Orsay (FR)

(73) Assignee: Google Technology Holdings LLC, Mountain View, VA (US)

( * ) Notice: Subject to any disclaimer, the term of this patent is extended or adjusted under 35 U.S.C. 154(b) by 2337 days.

(21) Appl. No.: 10/596,793

(22) PCT Filed: Dec. 17, 2004

(86) PCT No.: PCT/US2004/042528
§ 371 (c)(1),
(2), (4) Date: Oct. 26, 2008

(87) PCT Pub. No.: WO2005/064831
PCT Pub. Date: Jul. 14, 2005

(65) Prior Publication Data
US 2011/0051725 A1 Mar. 3, 2011

(30) Foreign Application Priority Data

Dec. 23, 2003 (EP) .................................. 03293293

(51) Int. Cl.
*H04L 12/761* (2013.01)
*H04L 12/701* (2013.01)
(Continued)

(52) U.S. Cl.
CPC ................ *H04L 45/00* (2013.01); *H04L 12/18* (2013.01); *H04L 45/16* (2013.01); *H04L 12/185* (2013.01); *H04W 8/26* (2013.01); *H04W 80/04* (2013.01)
USPC ........................... 370/390; 370/432; 370/467

(58) Field of Classification Search
CPC ..... H04M 7/006; H04W 80/04; H04W 84/12; H04W 84/18; H04L 12/18; H04L 12/185; H04L 29/06027; H04L 29/06326; H04L 45/16
See application file for complete search history.

(56) References Cited

U.S. PATENT DOCUMENTS 6,751,218 B1   6/2004 Hagirahim
6,754,224 B1   6/2004 Murphy
(Continued)

FOREIGN PATENT DOCUMENTS

CN            1411248 A       4/2003

OTHER PUBLICATIONS

Venaas S., "An IPv4—IPv6 multicast gateway", Internet Engineering Task Force Internet Draft: draft-venaas-mboned-v4v6mcastgw-00. txt, Feb. 2003.*

(Continued)

*Primary Examiner* — John Pezzlo
*Assistant Examiner* — Matthew Campbell
(74) *Attorney, Agent, or Firm* — Fish & Richardson P.C.

(57) ABSTRACT

A method of communicating traffic from a source to a group (G) of nodes including a Network Node (MNN) in a network using one or more multicast protocols. The network also comprises a Router (MR) for forwarding traffic between the network and the Internet and a Multicast Signalling Gateway (MSG) co-located with the Router (MR) and translating on an interface signalling messages of a multicast routing protocol (MRP) into messages of a group membership protocol (GMP). In the case of mobile networks, the interface is preferably an egress interface of the Mobile Router (MR). The Multicast Signalling Gateway (MSG) preferably translates multicast packets together with unicast source addresses and multicast destination addresses of multicast packets between IPv4 and IPv6 protocols.

24 Claims, 5 Drawing Sheets

(51) Int. Cl.
*H04L 12/18* (2006.01)
*H04L 29/06* (2006.01)
*H04W 8/26* (2009.01)
*H04W 80/04* (2009.01)

(56) References Cited

U.S. PATENT DOCUMENTS

| | | |
|---|---|---|
| 6,788,696 B2 | 9/2004 | Allan |
| 6,853,639 B1 * | 2/2005 | Watanuki et al. ............. 370/390 |
| 7,320,029 B2 * | 1/2008 | Rinne et al. ................... 709/223 |
| 7,644,177 B2 * | 1/2010 | Kouvelas et al. ............. 709/238 |
| 2001/0053156 A1 | 12/2001 | Higuchi et al. |
| 2002/0150094 A1 | 10/2002 | Cheng et al. |
| 2003/0095523 A1 * | 5/2003 | Korus et al. ................... 370/338 |

OTHER PUBLICATIONS

Venaas S., "An IPv4—IPv6 multicast gateway", Internet Engineering Task Force Internet Draft: draft-venaas-mboned-v4v6mcastgw-00.txt, Feb. 2003.*
EPC Communication pursuant to Article 96(2), Apr. 26, 2006.
Canada Requisition by the Examiner, Sep. 4, 2007.
Deering et al: "The PIM Architecture for Wide-Area Multicast Routing,", IEEE/ACM Transactions on Networking, vol. 4, No. 2, pp. 153-162, Apr. 1996.
Chinese Notification of the First Office Action, May 27, 2010.
Japanese office action, Sep. 24, 2008.

* cited by examiner

| INTERFACE | GROUP | SOURCE LIST |
|---|---|---|
| ifc_1 | G1 | MSG_srclist(ifc1, G1)={S1, S1', S1", ...} |
| | G2 | MSG_srclist(ifc1, G1)={S1,S1',S1", ...} |
| | ⋮ | ⋮ |
| ifc_2 | G3 | MSG_srclist(ifc2, G3)= {*} |
| | ⋮ | ⋮ |
| ⋮ | ⋮ | ⋮ |

*FIG. 5*

ROUTE-OPTIMISED MULITCAST TRAFFIC FOR A MOBILE NETWORK NODE

This application claims the benefit of prior filed co-pending International Application No. PCT/US2004/042528, filed Dec. 17, 2004, assigned to Motorola, Inc., and published by the International Bureau on Jul, 14, 2005 under WO2005/064831, and EPC Application No. 03293293.1, filed Dec. 23, 2003.

FIELD OF THE INVENTION

This invention relates to route-optimised multicast traffic for a mobile network node.

BACKGROUND OF THE INVENTION

Traditional mobility support aims to provide continuous Internet connectivity to mobile hosts; thus offering host mobility support. In contrast, network mobility support is concerned with situations where an entire network changes its point of attachment to the Internet topology and thus its reachability in the topology. Such a network in movement can be called a Mobile Network.

There exist a large number of scenarios where such Mobile Networks exist. Two out of many examples are:

A Personal Area Network (PAN, i.e. a network of several personal devices attached to an individual) changing its point of attachment to the Internet topology while the user is walking in a shopping mall.

A network embedded in a vehicle, such as a bus, a train or an aircraft providing on-board Internet access to passengers. A passenger may use a single device (such as a laptop computer) or own a Mobile Network (such as a PAN), which then illustrates a case of a Mobile Network visiting a Mobile Network (that is to say nested mobility).

As such, a Mobile Network can be defined as a set of nodes (so called Mobile Network Nodes or MNNs) forming one or more IP-subnets attached to a Mobile Router (MR), the Mobile Network (the MR and all its attached MNNs) being mobile as a unit with respect to the rest of the Internet. Internet-Draft draft-ernst-monet-terminology-00.txt [Thierry Ernst, Hong-Yon Lach, "Network Mobility Support Terminology", draft-ernst-monet-terminology-00.txt, February 2002, work in progress] defines terminology for Mobile Networks that will be used in the following. Especially the following terms are defined:

Local Fixed Node (LFN): A node permanently located within the Mobile Network and that does not change its point of attachment. A LFN can either be a LFH (Local Fixed Host) or a LFR (Local Fixed Router).

Local Mobile Node (LMN): A mobile node that belongs to the Mobile Network and that changes its point of attachment from a link within the mobile network to another link within or outside the Mobile Network (the home link of the LMN is a link within Mobile Network). A LMN can either be a LMH (Local Mobile Host) or a LMR (Local Mobile Router).

Visiting Mobile Node (VMN): A mobile node that does not belong to the Mobile Network and that changes its point of attachment from a link outside the Mobile Network to a link within the Mobile Network (the home link of the VMN is not a link within the Mobile Network). A VMN that attaches to a link within the Mobile Network obtains an address on that link. A VMN can either be a VMH (Visiting Mobile Host) or a VMR (Visiting Mobile Router).

Mobile Network Prefix: A bit string that consists of some number of initial bits of an IP address which identifies a Mobile Network within the Internet topology. Nodes belonging to the Mobile Network (i.e. at least MR, LFNs and LMNs) share the same IPv6 "network identifier". For a single mobile IP-subnet, the Mobile Network Prefix is the "network identifier" of this subnet.

Egress Interface of a MR: The interface attached to the home link if the Mobile Network is at home, or attached to a foreign link if the Mobile Network is in a foreign network.

Ingress Interface of a MR: The interface attached to a link inside the Mobile Network.

Figure 1:
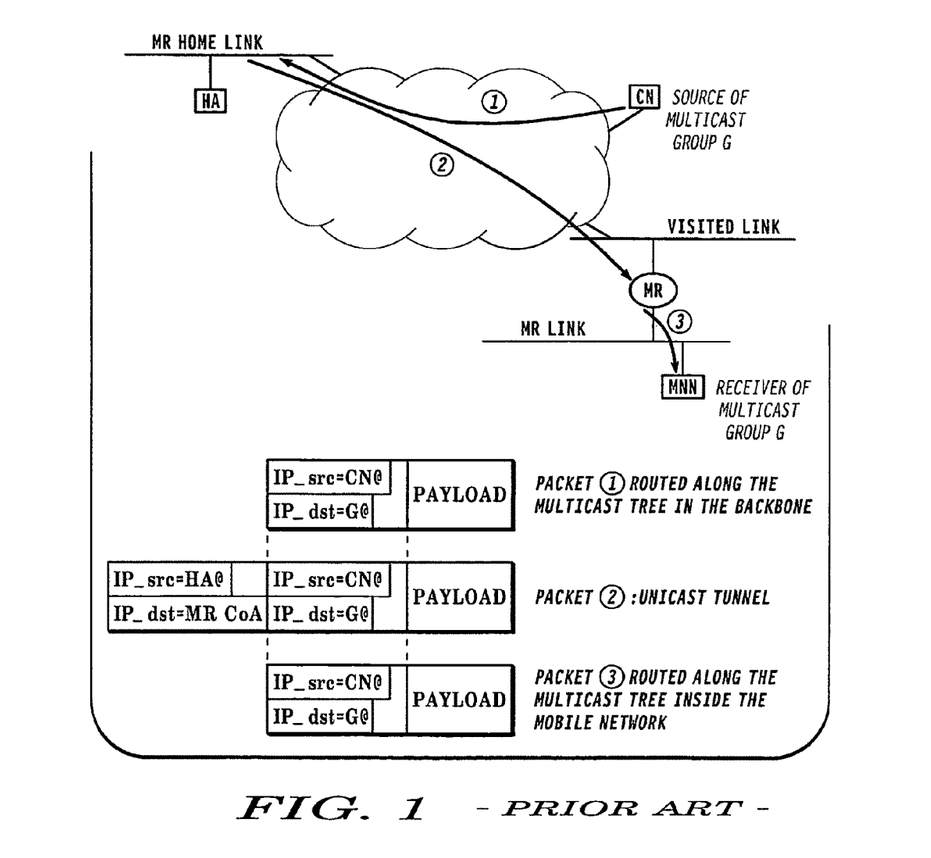
FIG. 1 is a schematic diagram of routing of inbound multicast packets in accordance with a known method.

Whereas the draft Mobile IPv6 specification [D. Johnson, C. Perkins, J. Arkko, "Mobility Support in IPv6"", draft-ietf-mobileip-ipv6-20.txt, January 2003, work in progress] defines two means for a Mobile Node to receive multicast traffic while on the move, namely bi-directional tunnelling and remote subscription, only the bi-directional tunnelling approach is currently foreseen in the case of a Mobile Network. In fact, most advanced proposals rely on bidirectional tunnelling between the Mobile Router and its Home Agent through which unicast and multicast traffic of Mobile Network Nodes should be forwarded in both directions. Especially in the case of multicast traffic:

Inbound multicast packets for MNN (i.e. multicast packets addressed to a multicast group G to which MNN has subscribed—MNN is a multicast receiver) are routed along the multicast tree in the backbone towards the Mobile Router's home link; intercepted by the MR's Home Agent HA that tunnels them through a unicast tunnel to the MR, de-tunnelled by MR and forwarded along the multicast tree within the Mobile Network, and finally received by MNN as shown in FIG. 1 of the accompanying drawings.

Figure 2:
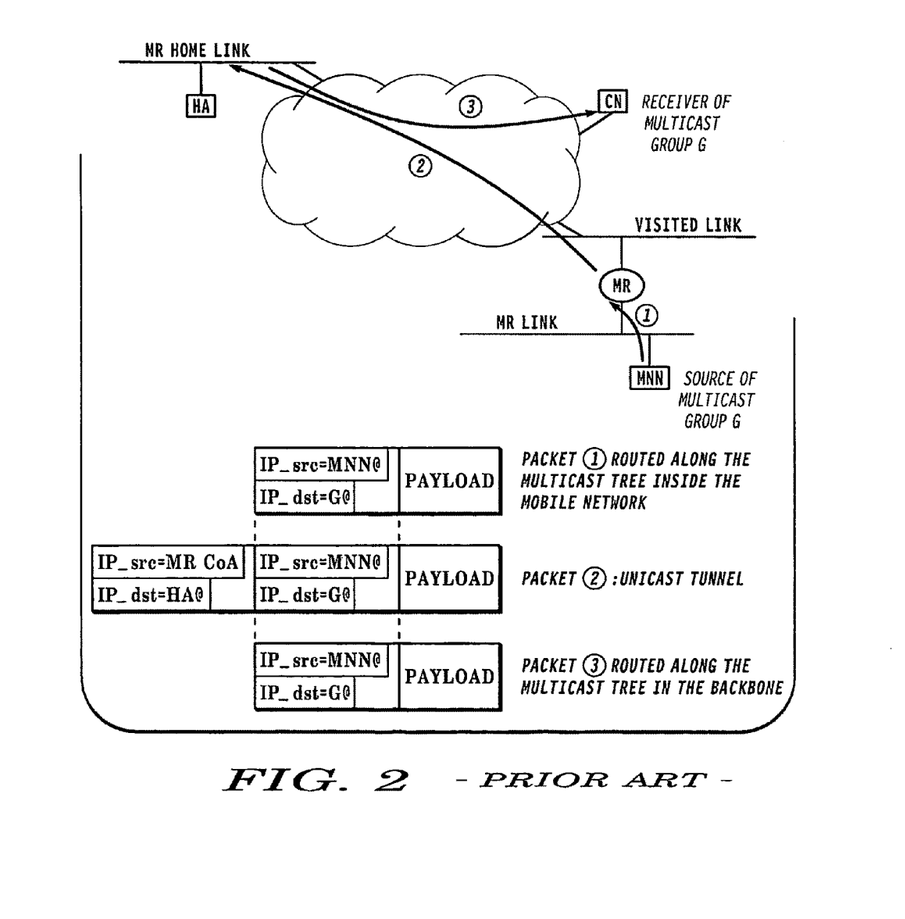
FIG. 2 is a schematic diagram of routing of outbound multicast packets in accordance with the method of FIG. 1.

Outbound packets (i.e. multicast packets sent by MNN to a multicast group G—MNN is a multicast source) are routed towards the Mobile Router, reverse-tunnelled by MR to its Home Agent HA, and from there routed towards the multicast delivery tree as shown in FIG. 2.

This mechanism does not provide route optimization to the MNNs since multicast packets between the multicast delivery tree (in the backbone) and the MNN must go through the bi-directional tunnel between MR and HA, which potentially introduces a much longer path (take as illustrative example a MR deployed in a plane flying over the USA while its HA is located in France).

Thus there is a need for a means to enable MNNs to receive multicast traffic along an optimized path, that is to say, to have packets delivered through the multicast tree to or from the current location of the Mobile Router without needing to transit through the MR Home Agent HA.

US Patent specification 20020150094 proposes a new IP multicast routing protocol, called "Hierarchical Level-based IP Multicasting" (HLIM) which is said to support not only host mobility (movement of IP hosts) but also network mobility (movement of IP routers with or without attached hosts). Especially, HLIM is claimed to preserve on-the-shortest-path delivery of multicast traffic from a source to a receiver located within a mobile network as the network changes its attachment point in the topology. However, HLIM, which has been designed for tactical networks, can only operate in very specific network topology (hierarchical networks), which is not the case of the Internet, thus limiting its applicability for commercial applications. In addition, HLIM requires all routers in the topology to run this new protocol which is unrealistic in the Internet whose multicast model is based on many multicast domains (owned by different parties) and possibly running different multicast protocols (such as DVMRP, MOSPF, PIM-SM, PIM-DM, CBT, for example). Thus HLIM does not provide a means to support route optimised delivery of multicast traffic to a mobile network roaming in the Internet, irrespective of the multicast routing protocols used within and outside of the mobile network.

It is not desirable for a Mobile Router to rely on relaying multicast routing signalling messages (used to manage the multicast tree) between the nodes in the mobile network and the visited network (instead of through its home network and its Home Agent HA) in order to reconstruct a branch of the multicast tree towards the current location of the multicast-enabled mobile router. This approach is applicable if and only if the same multicast routing protocol is run both within the mobile network and visited network. As explained above, due to the very large number of existing multicast protocols, this requirement will rarely be met in practice. As a result, this approach does not enable route-optimised delivery of multicast traffic irrespective of the location of the mobile network in the Internet. In addition, in practice, security policies of the visited network will generally forbid any injection of routing signalling (unicast and multicast) from non-authorized nodes such as a visiting mobile router (the mobile router may be owned by a different organisation).

It has been proposed that the Mobile Network deploy on all routers within the mobile network a mechanism called "IGMP/MLD-based Multicast Forwarding" [B. Fenner, H. He, Nortel Networks, B. Haberman, H. Sandick, "IGMP/MLD-based Multicast Forwarding ("IGMP/MLD Proxying"), draft-ietf-magma-igmp-proxy-02.txt, March 2003, work in progress] instead of running a multicast routing protocol internally. This approach is intended to allow the Mobile Router to collect all multicast group membership information coming from within its mobile network, and subscribe itself to all those multicast groups using IGMP/MLD protocol with the multicast-enabled access router in the visited domain. Group membership information will be relayed hop-by-hop, in the mobile network, from the intended multicast receiver up to the Mobile Router, by means of all intermediate fixed routers proxying incoming IGMP/MLD Report messages received towards its parent router (this is known as IGMP proxying, or MLD proxying). In this approach, the Mobile Router handles the multicast subscription in the visited domain on behalf of all the nodes in the mobile network. Upon movement, it will trigger reconstruction of a new multicast branch at its new location by sending MLD Reports to its new attachment point. However this approach requires heavy manual configuration, in particular to define upstream and downstream interfaces, on each router in the mobile network to make its internal topology like a tree routed at the Mobile Router. This makes this approach applicable only for relatively small mobile networks with stable internal topology. In addition, it imposes deployment of a new forwarding mechanism (IGMP/MLD proxy) on each internal router, and does not support route-optimised delivery of multicast traffic for any other form of multicast routing deployed in the Mobile Network. This is a limitation, especially for large mobile networks where regular multicast routing protocols are expected to be deployed to ease multicast support within the mobile network.

Thus there is a need for a mechanism enabling route-optimised delivery of multicast traffic to and from a mobile network:

irrespective of the location of the mobile network in the Internet, irrespective of the type of multicast routing protocols used within and outside of the mobile network, and through extension of the Mobile Router involved alone, that is to say with no change to any node in the mobile network nor in the Internet.

SUMMARY OF THE INVENTION

The present invention provides a method of communicating traffic from a source to a group of nodes including a Mobile Network Node (MNN) in a Mobile Network using one or more multicast protocols and apparatus for use in such a method as described in the accompanying claims.

DETAILED DESCRIPTION OF THE PREFERRED EMBODIMENTS

Figure 3:
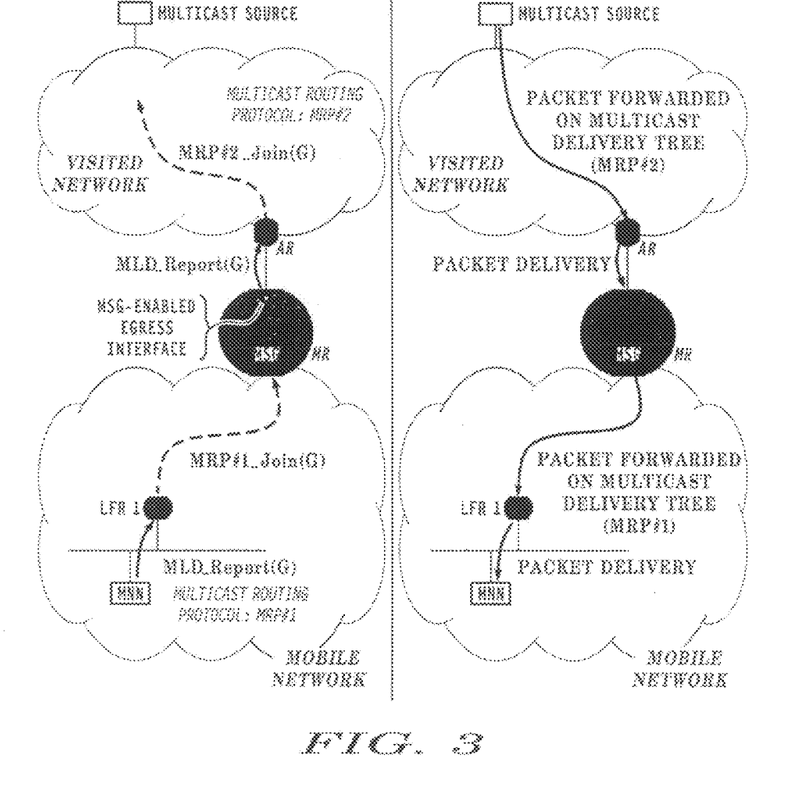
FIG. 3 is a schematic diagram of routing of inbound multicast packets in accordance with one embodiment of the invention, given by way of example.
Figure 4:
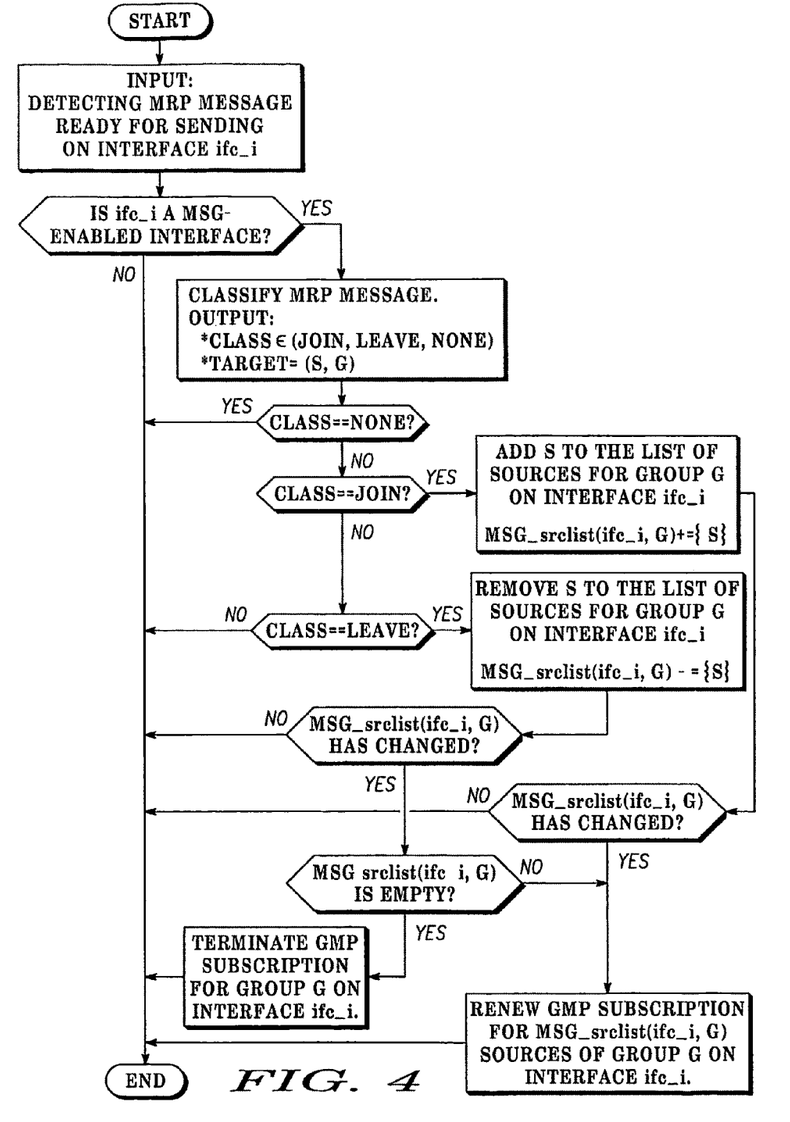
FIG. 4 is a flow chart of steps in the method shown in FIG. 3.
Figure 5:
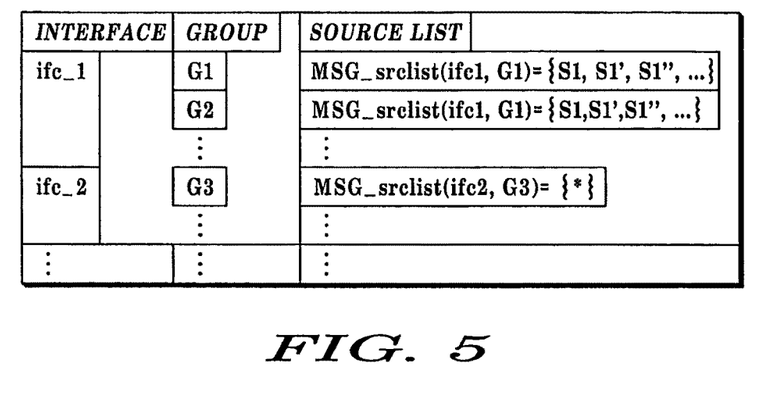
FIG. 5 is an example of a group list maintained in the method shown in FIG. 3.

The embodiments of the present invention shown in FIGS. 3 to 5 of the accompanying drawings provide a large degree of route optimisation for multicast traffic offering certain key advantages:

Minimal delay since packets are sent on the shortest path. This is important since many multicast applications have stringent requirements in term of delay (for example audio/video streaming, audio/video conferencing).

Reduced probability of packet loss due to congestion since packets are sent along a shorter path. Again for real time multicast applications, this will improve quality of the stream at the receiver side.

Enhanced scalability and robustness. By bypassing the Home Agent HA of the Mobile Router, which may easily be overloaded due to the concentration of multicast traffic at this point, route optimisation reduces the probability of failure.

Reduced bandwidth overhead as packets are not tunnelled. This helps optimising network resources.

Maximal PMTU (Path Maximum Transmission Unit) on MNN-CN path, which ensures minimal fragmentation of payload.

The embodiment of the present invention shown in FIG. 3 comprises a Multicast Signalling Gateway (MSG) co-located with the Mobile Router and having an MSG-enabled network interface to achieve route-optimised delivery of multicast traffic to the mobile network irrespective of the location of the mobile network in the Internet, and irrespective of the multicast routing protocols used within and outside of the mobile network.

A key principle of the MSG is to translate messages of a multicast routing protocol (MRP) into messages of a group membership protocol (GMP). It will be appreciated that this functionality of the MSG is completely different from the known ways that MRP and GMP protocols interoperate, including the translation of GMP messages into MRP messages.

A possible way for the MSG to generate the GMP messages, as detailed below, is to rely on the so-called "service interface" provided by these GMP protocols. The "service interface" can be used by upper-layer protocols or application programs to ask the IP layer to enable and disable reception of packets sent to specific IP multicast addresses (optionally only from a given set of sources). This service interface can be understood as a function call, typically that is made available at the socket API level. This is available for both IPv4 (IGMP) and IPv6 (MLD).

Multicast Routing Protocols (MRP) are protocols responsible for the construction of a multicast delivery tree, for instance DVMRP, MOSPF; PIM-SM, PIM-DM, CBT, etc. Basically, two families of multicast routing protocols can be distinguished:

Protocols using explicit signalling to build the multicast tree: Those protocols define specific messages to be used by a receiver's multicast router to trigger establishment of a multicast delivery branch towards itself. PIM-SM is one example of such protocols. These messages can be divided into two main categories:
  "Join group": Messages used by a multicast router to join the multicast delivery tree. An example of such message is PIM-SM Join.
  "Leave group": Messages used by a multicast router to leave the multicast delivery tree. An example of such a message is PIM-SM Prune.

Protocol using flooding: These protocols do not necessarily define specific messages to be used by a receiver's multicast router to join a multicast delivery tree. On the contrary, packets send by a multicast source are flooded over the whole network and listened by any interested nodes. Most of existing protocols of this category however include explicit signalling enabling to "prune" a branch to stop delivery of multicast traffic over a region of the network where there are no interested receivers. They also include support for "grafting" a branch when a new receiver appears. PIM-DM is one example of such protocols.

Group membership protocols (GMP) are protocols enabling a multicast receiver to announce its interest in receiving multicast packets sent to a multicast group G. Those are the Internet Group Management Protocol (IGMP) for IPv4, and Multicast Listener Discovery protocol (MLD) for IPv6. Note that recent versions of these protocols, IGMPv3 [B. Cain, S. Deering, B. Fenner, I. Kouvelas, A. Thyagarajan, "Internet Group Management Protocol, Version 3", RFC3376, May 2002] and MLDv2 [R. Vida, L. Costa, "Multicast Listener Discovery Version 2 (MLDv2) for IPv6", draft-vida-mld-v2-06.txt, November 2002, work in progress], when compared to the previous versions, add support for "source filtering". This refers to the ability for a receiver to report interest in listening to packets only from specific source addresses, or from all but specific source addresses, sent to a multicast address.

By 'MSG-enabled network interface' is meant a network interface of a node running a multicast routing protocol on which Multicast Signalling Gateway operations are activated. A node may have several MSG-enabled network interfaces at the same time. In the case of the Mobile Router, all its egress interfaces should be MSG-enabled to achieve interworking between multicast routing protocols within and outside the mobile network thanks to a Group Membership Protocol.

FIG. 3 illustrates the use of MSG for the case of a mobile router (MR) equipped with a single egress interface, by way of example. Multicast routing protocol MRP#1 is run within the mobile network. The MR is attached to a visited network that runs a different multicast routing protocol MRP#2. Both MRP#1 and MRP#2 are assumed to be part of the "explicit signalling" family. IPv6 is also assumed both in the mobile network and the visited network. Because of the IPv6 context, the group membership protocol (GMP) is MLD. MSG is enabled on MR's egress interface.

When a node MNN within the mobile network subscribes to multicast group G, it sends an MLD_Report(G) message of Group Membership Protocol towards his local multicast router LFR1. Since LFR1 is not yet attached to the multicast tree of group G (assuming MNN is the first receiver for group G below LFR1), LFR1 sends an explicit MRP#1_Join(G) message of Multicast Routing Protocol #1 within the mobile network to trigger establishment of a delivery branch towards LFR1. This branch establishment request propagates within the mobile network, eventually up to the Mobile Router whose local instance of MRP#1 protocol would decide to issue a MRP#1_Join(G) towards the egress interface. Since this interface is MSG-enabled, MR instead issues an MLD_Report(G) message of Group Membership Protocol towards Access Router (AR) in the visited network, which results in MRP#2_Join(G) messages of Multicast Routing Protocol #2 propagating within the visited network towards the multicast delivery tree of group G. These operations have enabled creation of two multicast delivery branches (one in each multicast domain) interconnected by the Mobile Router. As a result, multicast packets (e.g. from a source S) sent to group G are MRP#2-native multicast routed towards MR in the visited network, and there from MRP#1-native multicast routed towards MNN.

The MSG-enabled Mobile Router MR handles the multicast subscription in the visited domain on behalf of all the nodes in the mobile network. The MSG automatically discovers the subscription information (that is to say group and list of sources of interest) from the MRP messages arriving from within the mobile network. When MR changes its point of attachment to the visited network (or Internet), the MR will trigger reconstruction of one or more new multicast branches at its new location by sending MLD Report(s) to its new attachment point for the multicast group(s) it has subscribed to. This is referred to as Remote Subscription.

FIG. 4 is a flow chart of operations undertaken by the Multicast Signalling Gateway (MSG) in one embodiment of the present invention when detecting a Multicast Routing Protocol message (MRP message) about to be sent through a network interface ifc_i of the node hosting the MSG.

If the interface ifc_i is not MSG-enabled, then the MSG just ignores the message.

If the interface ifc_i is MSG-enabled, then the MRP message is analysed to determine:
  The class of the MRP message: The class takes one of the following three values {JOIN, LEAVE, NONE} as a function of the type of the MRP message (or the impact it has on the multicast delivery tree). Any message of a MRP can be assigned one of these three values. This information can be stored within a table that is referred to as a class table to be used by the MSG for the purpose of classifying messages of a given multicast routing protocol.
  The target of the MRP message: the target consists of the multicast Group G the message refers to, possibly together with an address of a source S. If a source address is not present, this means the packet refers to any potential source. In this case, the wildcard "*" symbol is used to represent all sources: S=*. The target can be expressed as a couple (S,G), or (*,G) in case no source specific information is conveyed.

If the class of the MRP message is NONE, no specific action is required from the MSG for this packet. This typically means that the packet has no semantic that should be translated into a GMP protocol message for the purpose of realising interworking between multicast protocols on both side of the MSG.

If the class of the MRP message is JOIN, the source S (from the target) must be added to the existing list of sources of group G (from the target) maintained by MSG for interface ifc_i: MSG_srclist(ifc_i,G). This is the list of sources of group G for which the MSG should maintain reception of traffic, through interface ifc_i. For this purpose the MSG maintains a list that is referred to as a group list, as illustrated in FIG. 5, that includes, for each MSG-enabled interface, the list of groups that are of interest together with their respective lists of sources. Once MSG_srclist(ifc_i,G) has been updated (or created in case of a new entry) with the source S from the target, it should be checked whether this adding of S has modified MSG_srclist(ifc_i,G). If MSG_srclist(ifc_i,G) has not been modified then no action is required. On the other hand, if MSG_srclist(ifc_i,G) has changed then the MSG must renew the GMP subscription for this new set of sources of group G on interface ifc_i. The MSG can use the GMP "services interface" (or API) for this purpose as any other multicast application does.

If the class of the MRP message is LEAVE, the source S (from the target) must be removed from the existing list of sources of group G (from the target) maintained by MSG for interface ifc_i: MSG_srclist(ifc_i,G). Once MSG_srclist(ifc_i,G) has been updated, it should be checked whether this removal of S has modified MSG_srclist(ifc_i,G). If MSG_srclist(ifc_i,G) has not been modified then no action is required. On the other hand, if MSG_srclist(ifc_i,G) has changed and is now empty, the MSG must terminate the GMP subscription to group G on interface ifc_i. In addition, the MSG may remove the entry for group G in its group list for ifc_i. If the updated MSG_srclist(ifc_i,G) is not empty, the MSG must renew the GMP subscription for this new set of sources of group G on interface ifc_i. The MSG can use the GMP "services interface" (or API) for this purpose as any other multicast application does.

The following arithmetic can be used when adding (+) or removing (−) a source (S or *) to/from a source list MSG_srclist(ifc_i,G):

A source can appear only once in the list: S+S=S, S−S=Ø

Adding all sources (*) to a list makes the list include all sources: srclist+*=* (of course *+*=*)

Removing all sources (*) from a list makes the list be empty (Ø): srclist−*=Ø (especially, *−*=Ø)

Removing a defined source S from a list that includes all sources (*) does not change the list:

*−S=*.

FIG. 5 shows an example of group list maintained by a MSG. The following table shows the class table that can be used by a MSG for the PIM-SM multicast routing protocol. Similar class tables can be established for any multicast routing protocol (having explicit signalling) to be used by the MSG.

| Class table for PIM-SM messages | |
| --- | --- |
| PIM-SM Messages | Class |
| Hello | NONE |
| Bootstrap | NONE |
| Candidate-RP-advertisement | NONE |
| Register | NONE |
| RegisterStop | NONE |
| (*, *, RP) Join | NONE |
| (*, *, RP) Prune | NONE |
| (*, G) Join | JOIN |
| (*, G) Prune | LEAVE |
| (S, G) Join | JOIN |
| (S, G) Prune | LEAVE |
| (S, G, rpt) Join | NONE |
| (S, G, rpt) Prune | NONE |
| (*, G) Assert | NONE |
| (S, G) Assert | NONE |

Forwarding of multicast packets on an MSG-enabled node is very simple, and actually transparent to the MSG. Forwarding of multicast packets is done according to the multicast forwarding table of the MRP protocol run by the MSG-enabled node. This is true irrespective of whether the incoming interface is MSG-enabled or not.

Especially, in the case of the Mobile Network, multicast packets from a source external to the Mobile Network (that is to say, which have been subscribed to through the MSG-enabled interface) will be multicast-routed towards MR's egress interface (MSG-enabled) and therefrom multicast-routed within the Mobile Networks according to the local multicast forwarding table of the MR.

When the MSG-enabled interface of the Mobile Router (MR) changes its point of attachment to the visited network (or Internet), the MSG will trigger reconstruction of needed multicast branches at its new location by sending GMP report messages to subscribe to the multicast group(s) (and respective sources) listed in the group list for the MSG-enabled interface.

A Mobile Router (MR) for which a given egress interface is at home can decide either to configure this interface as MSG-enabled or not to do so. Irrespective of the option selected, multicast traffic will be routed to MNNs in the same manner (according to the local multicast forwarding table of the MR). However, configuring the interface as MSG-enabled even when at home, will allow ongoing multicast communications to be maintained when the interface attaches to another topological location. This is because MSG will have learnt the list of ongoing groups G (and associated sources) and will then be able to re-subscribe to them at the new location.

In case MSG-enabled interface of the Mobile Router (MR) returns home and the Mobile Router (MR) decides to deactivate MSG on this interface, the multicast routing protocol will then operate normally through this interface towards the home network. In such a case, the MSG may remove any state in its group list for that given interface.

Several approaches can be taken for the implementation of the Multicast Signalling Gateway (MSG). In particular, for example, it may be implemented 1) as a separate software module or 2) as an extension (patch) of a multicast routing protocol (MRP) implementation.

In both cases, in this embodiment of the present invention, the MSG interface towards the Group Membership Protocol (MSG-GMP interface) can be implemented by relying on the existing GMP "service interface": MulticastListen (socket, interface, multicast address, filter mode, source list).

In this approach the MSG asks the IP layer (GMP) to enable and disable reception of packets sent to a specific IP multicast address in the same way as any multicast application program does (for example through a GMP-enabled socket API). Implementation based on the above service interface can be realised in two different ways:

a) The MSG software handles the aggregation of sources for a given multicast group (MSG_srclist(ifc_i,G)) and uses a single socket identifier (sid) to pass the whole list:
MulticastListen(sid, ifc_i, G, INCLUDE, MSG_srclist (ifc_i,G)), or
MulticastListen(sid, ifc_i, G, EXCLUDE, { }), iff MSG_srclist(ifc_i,G) ==* b) The MSG software uses several socket ids (one per (S,G) target) to pass the respective target (S,G) and associated class derived from the MRP message to the MLD module who is then in charge of aggregating the sources for a given multicast group. For a given target (S,G):
If class is JOIN:
MulticastListen(target_sid, ifc_i, G, INCLUDE, S), or
MulticastListen(target_sid, ifc_i, G, EXCLUDE, { }), if S ==*
If class is LEAVE:
MulticastListen(target_sid, ifc_i, G, EXCLUDE, S), or
MulticastListen(target_sid, ifc_i, G, INCLUDE, { }), if S ==*

This second approach requires the MSG software to generate a unique target_sid per target and store it into the MSG group list.

The implementation of the MSG-MRP interface towards the multicast routing protocol (MRP) will depend on whether approach 1) or 2) is chosen. The objective of this interface is for MSG to detect "MRP Message ready for sending on interface ifc_i" (see MSG state machine in FIG. 4) to trigger MSG operations.

Approach 1): MSG, as an independent software module, can detect MRP messages by monitoring packets sent over the interface ifc_i.

Approach 2): MSG operations can be directly triggered by the MRP protocol implementation. For instance, the MSG-patched MRP implementation would invoke MSG procedures with the correct class and target information instead of sending a MRP messages through a MSG-enabled interface ifc_i.

In approach 1) MSG software is completely independent from the MRP and as a consequence may be used for any MRP as long as the corresponding class table is known. This eases software reusability.

In approach 2) MSG software is incorporated within the MRP implementation of the MSG-enabled node. This may provide more efficient implementation, for instance for detecting when MSG operation should be triggered.

While the Multicast Signalling Gateway (MSG) enables route-optimized delivery of multicast packets to a mobile network, it is also a very valuable approach to solve other types of issues. Below are two examples of other possible applications of the MSG:

MSG for fast multicast domains interconnection: The MSG may be deployed as a temporary interworking point between two fixed leaf multicast domains, for instance in case of failure of the interconnecting multicast backbone. As such MSG offers a temporary failure-recovery solution that is fast and easy to deploy for network administrators.

MSG for IPv4/IPv6 transition: The MSG offers a very convenient approach to interconnect IPv4 and IPv6 multicast clouds, so that IPv6 receivers can receive multicast traffic from IPv4 sources and vice versa. This is a very important use case considering that IPv4 and IPv6 protocols are foreseen to coexist for a relatively long time, until the transition phase from all-IPv4 to all-IPv6 completes. For this purpose the MSG should translate multicast packets (together with unicast source addresses and multicast destination addresses of multicast packets) from IPv4 to IPv6 and vice versa. Most previously known mechanisms for IPv4/IPv6 transition apply only for unicast traffic. A proposal has been made of a mechanism for multicast traffic [K. Tsuchiya et al, "An IPv6/IPv4 Multicast Translator based on IGMP/MLD Proxying (mtp)", draft-tsichiya-mtp-01.txt, February 2003, work in progress] that features an IPv4-IPv6 protocol translator and address mapper in order to realise forwarding of multicast packets between the IPv4 and IPv6 domains (and vice versa). However, this proposal mandates that the translator be manually preconfigured (by network administrator) to forward traffic for a given set of IPv4 (respectively IPv6) multicast addresses. During this setup, the translator joins ALL those preconfigured groups so that it is able to receive related traffic. This mechanism is clearly not efficient since it requires human intervention each time a new multicast group has to be translated. The MSG (extended with an IPv4-IPv6 header translator and address mapper) solves this issue by dynamically triggering reception of IPv4 (respectively IPv6) multicast traffic at the MSG only when needed by the IPv6 (respectively IPv4) domain.

Note that such use of an MSG-enabled Mobile Router enables an IPv6 (respectively IPv4) Mobile Network to roam into an IPv4 visited network (respectively IPv6) and receive multicast traffic from this visited network.

It will be appreciated that the embodiments of the invention described above offer a number of advantageous features. For example:

a means to enable delivery of multicast traffic to MNNs along an optimal path irrespective of the location of the mobile network in the Internet.

route optimisation for multicast traffic transparently to the MNNs: no change is required at the MNNs, even basic, non mobility-aware LFNs can benefit from route optimization (e.g. basic electronic devices in a car). Route optimisation is achieved by the sole MR.

route optimised delivery of multicast traffic for nested mobile networks (i.e. a mobile networks visiting another mobile network), irrespective of the number of level in the aggregate of nested mobile networks mechanisms for seamless mobility of mobile multicast host based on the remote subscription approach applicable to the case of mobile networks.

The above features are applicable without any changes to existing multicast routing protocols when co-located on a Mobile Router to enable route-optimized delivery of multicast packets.

Additionally, the MSG is:
applicable to other scenarios such as IPv4/IPv6 transitions.
very simple to implement.
does not require any change to existing protocols nor extensions on any other nodes in the network.

The invention claimed is:
1. A method of communicating traffic in a network, wherein the network comprises a Network Node (NN), a Router (MR) for forwarding traffic between the network and the Internet, and a Multicast Signalling Gateway (MSG) co-located with the Router (MR), the method comprising:
receiving multiple multicast routing protocol (MRP) messages each from a respective source and for a respective group (G) of nodes that includes the Network Node (NN);
determining that an outgoing router interface is a Multicast Signalling Gateway (MSG) enabled interface;
for each of the multicast routing protocol (MRP) messages:
detecting that the respective multicast routing protocol (MRP) message is about to be sent through the outgoing router interface; and
determining whether the multicast routing protocol (MRP) message relates to a group join class or a group leave class;
adding, by the Multicast Signalling Gateway (MSG) for each multicast routing protocol (MRP) message that relates to a group join class, the respective source to a list of existing sources for the respective group (G);
removing, by the Multicast Signalling Gateway (MSG) for each multicast routing protocol (MRP) message that relates to a group leave class, the respective source from the list of existing sources for the respective group (G); and
translating, by the Multicast Signalling Gateway (MSG) on the outgoing router interface for each multicast routing protocol (MRP) message that relates to a group join class or a group leave class, the respective multicast routing protocol (MRP) message into a corresponding group membership protocol (GMP) message.

2. A method as claimed in claim 1, wherein the Network Node (NN) is a Mobile Network Node (MNN) operating in a mobile network and the router is a Mobile Router (MR) for forwarding traffic between the mobile network and the Internet.

3. A method as claimed in claim 1, wherein determining whether the multicast routing protocol (MRP) message relates to a group join class or a group leave class comprises determining whether the multicast routing protocol (MRP) message relates to a group join class or a group leave class using a class table which provides the class as a function of the type of the multicast routing protocol (MRP) message.

4. A method as claimed in claim 1, wherein said Multicast Signalling Gateway (MSG) operating on said interface determines whether said signalling messages contain an identification of a target multicast Group (G) and translates the target multicast group identification into group membership protocol (GMP).

5. A method as claimed in claim 4 wherein said Multicast Signalling Gateway (MSG) operating on said interface determines whether said signalling messages contain an address of a target multicast group source (S) and translates the target source address into group membership protocol (GMP).

6. A method as claimed in claim 5 wherein said Multicast Signalling Gateway (MSG) maintains source lists that include identifications of groups (G) associated with their respective multicast group source addresses identified by said signalling messages.

7. A method as claimed in claim 6 wherein said Multicast Signalling Gateway (MSG) renews a GMP subscription for one of said groups (G) in response to a change in the list of said respective multicast group source addresses.

8. A method as claimed in claim 1, wherein said Multicast Signalling Gateway (MSG) renews a GMP subscription for groups and associated source lists maintained for said outgoing router interface in response to a change of topological attachment point of said interface.

9. A method as claimed in claim 1, wherein multicast packets from the Network Node (NN) are multicast-routed from said Multicast Signalling Gateway (MSG) within said network according to a local multicast forwarding table of said router (MR).

10. A method as claimed in claim 1, wherein said Multicast Signalling Gateway (MSG) uses a service interface as provided by the GMP protocols to generate the GMP messages, and thus to enable and disable reception of packets sent to specific IP multicast addresses by specific sources.

11. A method as claimed in claim 10, wherein said Multicast Signalling Gateway (MSG) aggregates sources for a given multicast group (G) and uses a single socket identifier (sid) to pass the aggregation of the sources for the given multicast group (G).

12. A method as claimed in claim 10, wherein said Multicast Signalling Gateway (MSG) uses different socket identifiers (target_sid) for respective targets (source S, multicast group G) derived from said signaling messages.

13. A method as claimed in claim 1, wherein said Multicast Signalling Gateway (MSG) detects Multicast Routing Protocol (MRP) messages by monitoring packets sent over the outgoing router interface.

14. A method as claimed in claim 1, wherein said Multicast Signalling Gateway (MSG) is embedded within an extension of a multicast routing protocol (MRP) implementation.

15. A method as claimed in claim 1, wherein said Multicast Signalling Gateway (MSG) translates multicast packets together with unicast source addresses and multicast destination addresses of multicast packets between IPv4 and IPv6 protocols.

16. A method as claimed in claim 1, wherein said Multicast Signalling Gateway (MSG) translates any MRP into IPv4 Internet Group Management Protocol (IGMP) messages.

17. A method as claimed in claim 1, wherein said Multicast Signalling Gateway (MSG) translates any MRP messages into IPv6 Multicast Listener Discovery protocol (MLD) messages.

18. A method as claimed in claim 1, wherein said Multicast Signalling Gateway (MSG) translates any MRP messages into IPv6 GMP messages and enables IPv4 nodes to receive multicast packets from IPv6 multicast groups and sources.

19. A method as claimed in claim 1, wherein said Multicast Signalling Gateway (MSG) translates any MRP messages into IPv4 GMP messages and enables IPv6 nodes to receive multicast packets from IPv4 multicast groups and sources.

20. A method as claimed in claim 1, wherein:
determining whether the multicast routing protocol (MRP) message relates to a group join class, or a group leave class comprises determining whether the multicast routing protocol (MRP) message relates to a group join class, a group leave class, or no class; and
the Multicast Signalling Gateway (MSG) forwards, for each multicast routing protocol (MRP) message determined to have no class, the respective multicast routing protocol (MRP) message to the group (G) of nodes without translation.

21. A method as claimed in claim 1, wherein at least one of the multicast routing protocol (MRP) messages has a group join class and at least one of the multicast routing protocol (MRP) messages has a group leave class.

22. A method as claimed in claim 1, wherein the Multicast Signalling Gateway (MSG):
determines that the list of existing sources is updated and not empty; and
in response, renews a subscription for the respective source for the respective group (G) after adding the respective source for the respective group (G) or removing the respective source for the respective group (G) from the list.

23. A method as claimed in claim 1, wherein the Multicast Signalling Gateway (MSG):
   determines that the list of existing sources is empty; and
   in response, terminates a subscription for a respective source for the respective group (G).

24. A method as claimed in claim 1, wherein:
   the Router (MR) comprises multiple outgoing router interfaces each of which correspond with one of the sources; and
   detecting, for each of the multicast routing protocol (MRP) messages, that the respective multicast routing protocol (MRP) message is about to be sent through the outgoing router interface comprises:
      determining that a respective outgoing router interface is a Multicast Signalling Gateway (MSG) enabled interface; and
      detecting that the respective multicast routing protocol (MRP) message is about to be sent through the respective outgoing router interface.

* * * * *